Feb. 1, 1938.       G. W. MASON       2,107,076
REFRIGERATING APPARATUS
Filed Feb. 25, 1937
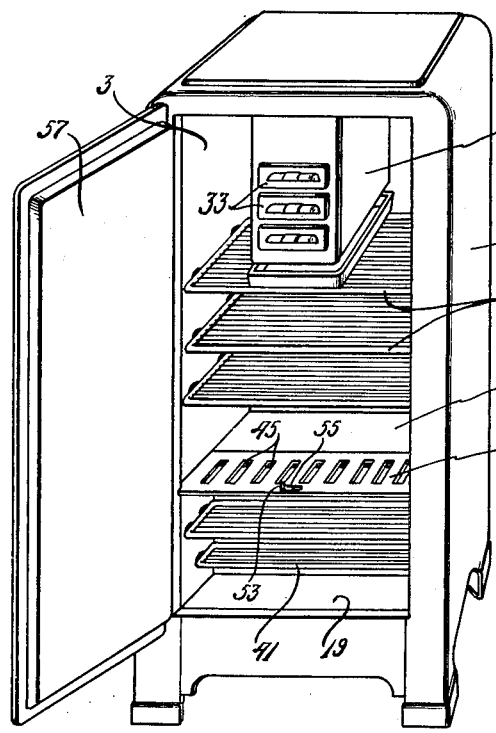
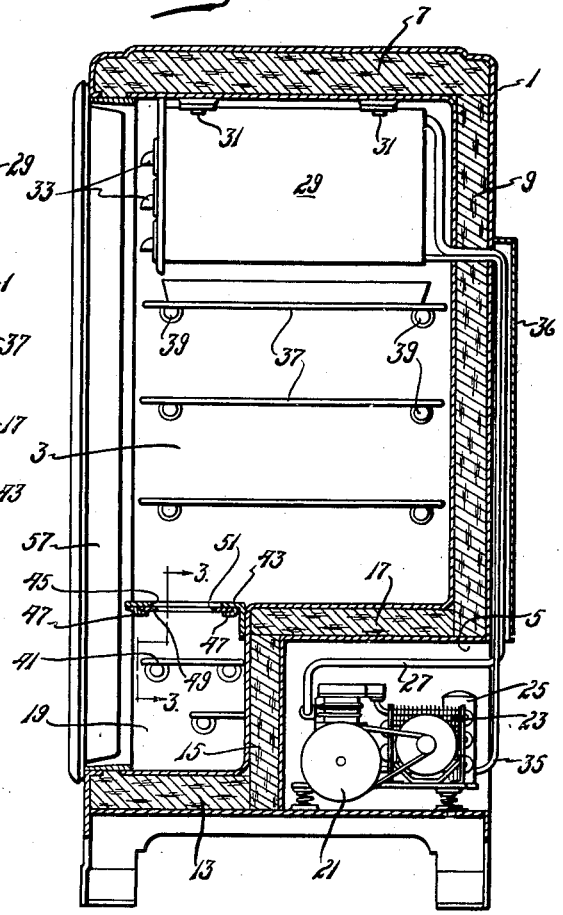
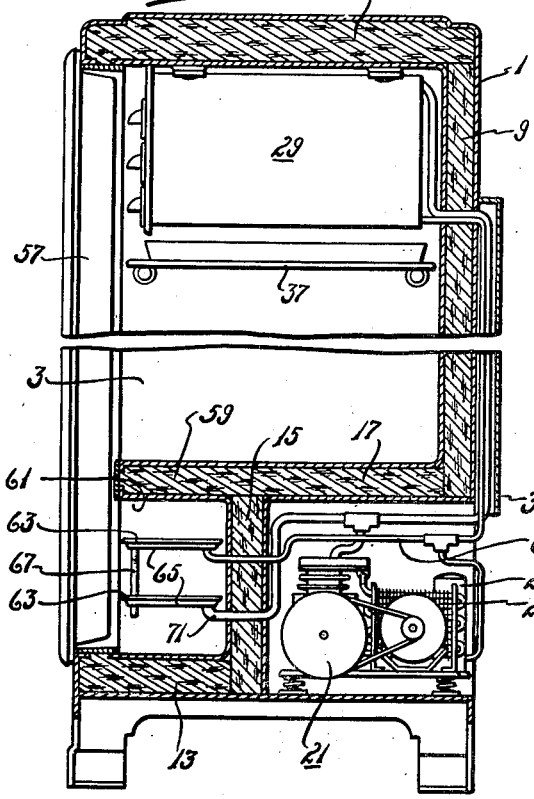
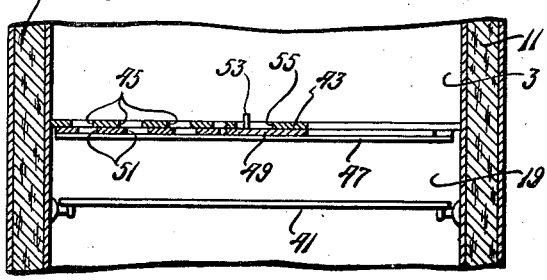
INVENTOR.
GEORGE W. MASON
BY Ralph E. Baker
ATTORNEY.

Patented Feb. 1, 1938

2,107,076

UNITED STATES PATENT OFFICE 2,107,076

REFRIGERATING APPARATUS

George W. Mason, Detroit, Mich., assignor to Nash-Kelvinator Corporation, Detroit, Mich., a corporation of Maryland Application February 25, 1937, Serial No. 127,624

1 Claim. (Cl. 62—116)

My invention pertains to refrigerators and more particularly to multiple-temperature household refrigerators.

It is an object of my invention to provide a refrigerator comprising an auxiliary food storage compartment enclosed by the heat insulating cabinet adjacent the main storage compartment and the machine compartment to efficiently utilize the cabinet space for storing food articles and having a dividing partition between the compartments whereby different temperatures may be had.

It is also an object of my invention to provide a refrigerator comprising a heat insulating cabinet enclosing a main storage compartment adjacent the machine compartment, and an adjustable dividing partition between the compartments whereby the thermal coupling between the main compartment and the auxiliary compartment may be adjusted to provide the desired degree of refrigeration in the latter.

It is a further object of my invention to provide a refrigerator of the above type wherein the auxiliary storage compartment is thermally insulated from and is cooled independently of the main food storage compartment.

The novel features that I consider characteristic of my invention are set forth with particularity in the appended claim. The invention itself, however, both as to its organization and its method of operation, together with additional objects and advantages thereof, will best be understood from the following descriptions of specific embodiments, when read in connection with the accompanying drawing, in which:

Fig. 1 is a perspective view of a multiple temperature household refrigerator arranged in accordance with my invention;

Fig. 2 is a sectional view taken vertically through the refrigerator from the front to the back thereof;

Fig. 3 is a sectional view on line 3—3 of Fig. 2; and

Fig. 4 is a vertical sectional view similar to Fig. 2 showing a modified embodiment of my invention.

Referring more specifically to Figs. 1, 2 and 3 of the drawing, my multiple temperature household refrigerator comprises a cabinet 1, which encloses a food storage compartment 3 and a machine compartment 5 in the bottom thereof. The cabinet 1 comprises a heat insulating upper wall 7, back wall 9 and side walls 11 which enclose the food storage compartment 3. The cabinet also comprises a heat insulating bottom wall 13 which joins the lower edge of a vertically disposed heat insulating wall portion 15 which, rising vertically, forms a stepped portion joining the front edge of an elevated bottom wall 17 which extends rearwardly and joins at its rear edge with the lower edge of the back wall 9.

The stepped heat insulating walls 13, 15 and 17 serve to thermally insulate the food storage compartment 3 from the machine compartment 5 and also serve to provide the food storage compartment with an offset portion 19 whereby a portion of the space under the refrigerator cabinet is efficiently utilized for storing small food articles adjacent to and thermally insulated from the machine compartment 5. By this arrangement a portion of the space in the bottom of the refrigerator cabinet which is usually wasted by assignment to the machine compartment is efficiently utilized, and in the machine compartment 5 is provided sufficient space for storing the usual refrigerant compressor 21, condenser 23, refrigerant accumulator 25 and accessories.

From the suction side of the compressor 21 in the machine compartment, a conduit 27 extends rearwardly from the machine compartment 5 and passes upwardly adjacent the back wall 9 of the refrigerator through which it enters for connection with a refrigerant evaporator cooling unit 29 which is suspended from the upper wall 7 of the food storage compartment in any suitable manner, as by fastening means 31. The cooling element 29 may be any conventional evaporator construction of suitable size for cooling the food storage compartment and comprising slidably inserted trays 33 for storing and freezing food and ice cubes in the usual manner.

From the accumulator 25, a conduit 35 passes rearwardly out of the machine compartment and extends upwardly adjacent the rear wall 9 of the refrigerator through which it enters for connection with the cooling unit 29 to which it supplies liquefied refrigerant. A tubular shield 36 extends vertically up the outside of the rear wall 9 of the refrigerator to cover the conduits 27 and 35 which may be also covered with any suitable heat insulating material.

Within the food storage compartment, large horizontally positioned shelves 37 may be mounted in vertically spaced relation on suitable shelf supports 39 for storing the food articles to be preserved in the refrigerator. The offset food storage compartment 19 is provided with small shelves 41 suitably spaced for receiving and storing smaller food articles therein.

In order that the food articles stored in the food storage compartment 3 and the offset portion 19 thereof may be maintained at different temperatures to preserve the various food articles stored therein, I provide partition means 43 which extends substantially horizontally in alignment with the upper surface of the bottom wall portion 17 of the main food storage compartment. The partition means 43 thus separates the offset portion 19 as an auxiliary food storage compartment from the main storage compartment.

To provide for cooling the auxiliary food storage compartment 19 to the desired temperatures, the partition means 43 preferably comprises an adjustable damper for controlling the flow of air therebetween. For this purpose, the partition means 43 comprises a substantially flat plate having apertures 45 extending therethrough in spaced relation and the damper plate is provided with flange portions 47 which are spaced below the lower surfaces thereof and turned toward each other to provide inturned grooves wherein a damper 49 is slidably disposed. The slidable damper 49 is also provided with spaced apertures 51 which are suitably spaced therein for alignment with the spaced apertures 45 whereby free flow of air therethrough may be provided in any desired degree in accordance with the relative position of the damper of the slidable damper 49 thereunder. To provide for conveniently adjusting the slidable damper 49, a pin 53 projects upwardly from an intermediate portion thereof through an elongated slot 55 in the damper plate 43. The front of the refrigerator cabinet comprises an open doorway which is closed by a door 57 of the usual heat insulating construction which is hinged along one vertical edge thereof to one side of the cabinet in the usual manner. By grasping the upper portion of the pin 53, the operator may conveniently slide the apertured damper 49 to regulate the size of the circulating air conducting passages whereby the thermal coupling between the compartments may be varied to provide the desired refrigeration in the auxiliary compartment 19.

When the door 57 is turned to closed position, as shown in Fig. 2, the inner surface of the door is disposed in adjacent relation to the front edge of the adjustable partition means 43 therein. The adjustable partition means 43 for controlling the thermal coupling between the compartments may be of sheet metal whereby heat is continuously absorbed from the auxiliary compartment 19 by thermal conduction therethrough, or it may be of non-metallic sheet material having a low coefficient of heat conductivity whereby the closure of the air conducting passages therein more effectively restricts the thermal coupling between the compartments.

Referring more particularly to Fig. 4 of the drawing, my multiple temperature refrigerator may be constructed by providing the main storage compartment 3 with a bottom wall 59 of heat insulating construction which extends from the lower edge of the rear wall 9 through to the front of the refrigerator adjacent to the inner surface of the door 57 whereby an auxiliary storage compartment 61 is provided which is thermally insulated from the main compartment. In accordance with this embodiment of my invention, the auxiliary storage compartment 61 is cooled independently of the main food storage compartment 3 and for this purpose I provide freezing shelf plates 63 therein.

Each of the cold shelf plates 63 comprises a plate of sufficient thickness to provide high specific heat capacity for holdover and is provided with conduit means 65 intimately associated therewith for absorbing heat by evaporating the volatile refrigerant. The freezing plates 63 are interconnected in series relation by a conduit 67 for passing refrigerant therethrough in series relation. For supplying refrigerant thereto, a conduit 69 connects from the refrigerant accumulator 25 to one of the refrigerant freezing plates 63, and for abstracting the refrigerant vapor, a conduit 71 is connected from the other one of the series connected freezing plates to the suction side of the compressor 21. As will be understood, the desired temperature conditions may be provided in the auxiliary compartment 61 by providing the freezing plate shelves 63 with refrigerant evaporating portions 65 of suitable capacity, or by regulating the rate of refrigerant vaporization therein in any suitable manner.

It will be seen that I have provided a simple multiple temperature household refrigerator wherein the space enclosed by the cabinet is efficiently utilized for providing food storage compartments wherein varying degrees of refrigeration may be maintained for conveniently storing various quantities of different food articles while mounting the condenser apparatus and accessories in efficient close connected relation thermally insulated therefrom.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

I claim:

In combination in a refrigerator, a cabinet comprising heat insulating walls enclosing a food storage compartment including an offset portion, a cooling element for cooling said food storage compartment, adjustable partition means for separating said offset portion as an auxiliary storage compartment whereby the thermal coupling between the compartments may be varied to provide the desired degree of refrigeration in the auxiliary compartment, a machine compartment enclosed by said cabinet adjacent to and thermally insulated from said offset auxiliary storage compartment.

GEORGE W. MASON.